(12) United States Patent
Nestico et al.

(10) Patent No.: US 11,073,090 B2
(45) Date of Patent: Jul. 27, 2021

(54) VALVED AIRFLOW PASSAGE ASSEMBLY FOR ADJUSTING AIRFLOW DISTORTION IN GAS TURBINE ENGINE

(71) Applicant: General Electric Company, Schenectady, NY (US)

(72) Inventors: Brian Francis Nestico, Loveland, OH (US); Brian K. Kestner, Cincinnati, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 452 days.

(21) Appl. No.: 15/084,898

(22) Filed: Mar. 30, 2016

(65) Prior Publication Data

US 2017/0284304 A1    Oct. 5, 2017

(51) Int. Cl.
*F02C 9/18* (2006.01)
*F02C 6/08* (2006.01)
(Continued)

(52) U.S. Cl.
CPC ............... *F02C 9/18* (2013.01); *F02C 3/13* (2013.01); *F02C 6/08* (2013.01); *F02C 7/047* (2013.01);
(Continued)

(58) Field of Classification Search
CPC .... F02C 7/047; F02C 9/18; F02C 6/08; F02C 7/18; F01D 25/02; F04D 27/0215
See application file for complete search history.

(56) References Cited

U.S. PATENT DOCUMENTS 2,604,278 A    7/1952   Johnson
2,857,092 A    10/1958  Campbell
(Continued)

FOREIGN PATENT DOCUMENTS

CN    1654804 A    8/2005
CN    1975130 A    6/2007
(Continued)

OTHER PUBLICATIONS

European Search Report issued in connection with corresponding EP Application No. 17163219.3 dated Aug. 11, 2017.
(Continued)

*Primary Examiner* — Katheryn A Malatek
(74) *Attorney, Agent, or Firm* — Dority & Manning, P.A.

(57) ABSTRACT

Systems and methods for adjusting airflow distortion in a gas turbine engine using a valved airflow passage assembly are provided. A gas turbine engine can include a compressor section, a combustion section, and a turbine section in series flow and defining at least in part an engine airflow path. The compressor section can include a compressor. The gas turbine engine can further include a valved airflow passage assembly comprising a valve and a duct, the duct defining an inlet in airflow communication with the engine airflow path at a location downstream of the compressor and an outlet in airflow communication with the engine airflow path at a location upstream of the compressor, the duct comprising an airflow passage extending between the inlet and outlet. The valve can be operable with the airflow passage for controlling an airflow through the airflow passage to adjust airflow distortion.

20 Claims, 8 Drawing Sheets

(51) Int. Cl.
*F04D 27/02* (2006.01)
*F02C 7/047* (2006.01)
*F02C 3/13* (2006.01)

(52) U.S. Cl.
CPC ...... *F04D 27/0215* (2013.01); *F05D 2260/96* (2013.01)

(56) References Cited

U.S. PATENT DOCUMENTS

| | | | |
|---|---|---|---|
| 3,392,585 | A | 7/1968 | Bentz et al. |
| 3,677,000 | A | 7/1972 | Thomson |
| 4,075,833 | A | 2/1978 | Sargisson |
| 4,163,365 | A | 8/1979 | Frutschi |
| 4,546,605 | A | 10/1985 | Mortimer et al. |
| 4,852,343 | A * | 8/1989 | Norris ............... B64D 15/22 60/779 |
| 5,076,052 | A | 12/1991 | Wildner |
| 5,230,603 | A | 7/1993 | Day |
| 5,284,012 | A | 2/1994 | Laborie et al. |
| 5,448,881 | A * | 9/1995 | Patterson ............ F02C 7/057 415/26 |
| 5,782,603 | A | 7/1998 | O'Brien et al. |
| 6,169,496 | B1 | 1/2001 | Martin et al. |
| 6,231,306 | B1 | 5/2001 | Khalid |
| 6,582,183 | B2 | 6/2003 | Eveker |
| 7,326,027 | B1 | 2/2008 | Skoch |
| 7,637,455 | B2 | 12/2009 | Silkey et al. |
| 7,811,049 | B2 | 10/2010 | Xu |
| 7,827,803 | B1 | 11/2010 | Wadia et al. |
| 7,861,578 | B2 | 1/2011 | Adibhatla et al. |
| 7,891,163 | B2 | 2/2011 | Richards |
| 8,313,280 | B2 | 11/2012 | Hurwitz et al. |
| 8,478,473 | B2 | 7/2013 | Adibhatla |
| 8,514,103 | B2 | 8/2013 | Maris |
| 8,550,767 | B2 | 10/2013 | Horn et al. |
| 8,641,367 | B2 | 2/2014 | Norris et al. |
| 8,740,548 | B2 | 6/2014 | Rowe et al. |
| 8,844,553 | B2 | 9/2014 | Zysman et al. |
| 9,194,301 | B2 | 11/2015 | Parente |
| 9,482,236 | B2 | 11/2016 | Khalid et al. |
| 9,777,633 | B1 | 10/2017 | Nestico et al. |
| 2003/0035719 | A1* | 2/2003 | Wadia ............... F02C 7/047 415/145 |
| 2009/0003997 | A1 | 1/2009 | Jain et al. |
| 2009/0169367 | A1 | 7/2009 | Wadia et al. |
| 2009/0297334 | A1 | 12/2009 | Norris et al. |
| 2010/0023238 | A1 | 1/2010 | Adibhatla |
| 2010/0024536 | A1 | 2/2010 | Adibhatla et al. |
| 2010/0040453 | A1 | 2/2010 | Vo |
| 2010/0172744 | A1* | 7/2010 | Bhatnagar ............ F01D 17/162 415/160 |
| 2010/0329851 | A1 | 12/2010 | Nilsson |
| 2011/0056210 | A1 | 3/2011 | Griffin et al. |
| 2011/0176913 | A1 | 7/2011 | Wassynger et al. |
| 2013/0103323 | A1 | 4/2013 | Snider et al. |
| 2013/0319009 | A1 | 12/2013 | Parente |
| 2013/0319099 | A1 | 12/2013 | Kishino et al. |
| 2014/0013765 | A1 | 1/2014 | Studerus et al. |
| 2014/0026588 | A1 | 1/2014 | Velez |
| 2014/0075956 | A1 | 3/2014 | Patsouris |
| 2014/0083176 | A1 | 3/2014 | Rhoden |
| 2014/0093350 | A1 | 4/2014 | Meisner et al. |
| 2014/0182292 | A1 | 7/2014 | Hudon et al. |
| 2014/0303832 | A1 | 10/2014 | Skertic |
| 2016/0237910 | A1 | 8/2016 | Saito et al. |
| 2016/0326903 | A1 | 11/2016 | Xu |
| 2016/0348531 | A1 | 12/2016 | Rice et al. |
| 2017/0218841 | A1 | 8/2017 | Nestico et al. |
| 2017/0218842 | A1 | 8/2017 | Nestico et al. |
| 2017/0218854 | A1 | 8/2017 | Nestico et al. |
| 2017/0284296 | A1 | 10/2017 | Nestico et al. |
| 2017/0284297 | A1 | 10/2017 | Nestico et al. |
| 2017/0284304 | A1 | 10/2017 | Nestico et al. |

FOREIGN PATENT DOCUMENTS

| | | | | |
|---|---|---|---|---|
| CN | 104619958 | A | 5/2015 | |
| DE | 3333437 | A1 | 4/1985 | |
| EP | 0628727 | B1 | 12/1994 | |
| EP | 1522710 | A2 | 4/2005 | |
| EP | 1942259 | A2 | 7/2008 | |
| EP | 2713015 | A2 | 4/2014 | |
| EP | 2998522 | A2 | 3/2016 | |
| EP | 3225815 | A1 | 10/2017 | |
| FR | 3004749 | A1 | 10/2014 | |
| GB | 867849 | A * | 5/1961 | ............ F02C 7/04 |
| GB | 867849 | A | 5/1961 | |
| GB | 1238897 | A | 7/1971 | |
| GB | 2005356 | A | 4/1979 | |
| GB | 2294094 | A | 4/1996 | |
| GB | 2452026 | A | 2/2009 | |
| JP | S5756699 | A | 4/1982 | |
| JP | S58-59399 | A | 4/1983 | |
| JP | S59196929 | A | 8/1984 | |
| JP | 2010/031841 | A | 2/2010 | |
| JP | 2010/031842 | A | 2/2010 | |
| JP | 2010/534787 | A | 11/2010 | |
| JP | WO2015064428 | A1 | 3/2017 | |
| JP | 2017/180459 | A | 10/2017 | |
| WO | WO2015/064428 | A1 | 5/2015 | |

OTHER PUBLICATIONS

Machine translation and First office action and search report issued in connection with corresponding CN Application No. 201710201951.9 dated Aug. 2, 2018.
Office Action issued in connection with corresponding CA Application No. 2960920 dated Apr. 30, 2018.
Machine Translation and Notification of Reasons for Refusal issued in connection with corresponding JP Application No. 2017-050699 dated May 15, 2018.
Canadian Office Action Corresponding to Application 2955539 dated Dec. 20, 2017.
Canadian Office Action Corresponding to Application 2955461 dated Dec. 28, 2017.
Canadian Office Action Corresponding to Application 2955461 dated Aug. 7, 2018.
Canadian Office Action Corresponding to Application 2960920 dated Jan. 31, 2019.
Chinese Office Action Corresponding to Application 2017100561654 dated Feb. 2, 2018.
Chinese Office Action Corresponding to Application 201710056206X dated Aug. 28, 2018.
Chinese Office Action Corresponding to Application 2017100561654 dated Nov. 5, 2018.
Chinese Office Action Corresponding to Application 2017102051497 dated May 7, 2019.
Chinese Office Action Corresponding to Application 201710056206X dated May 15, 2019.
Chinese Office Action Corresponding to Application 2017100561654 dated Jun. 4, 2019.
European Search Report Corresponding to Application 171529209 dated Jun. 2, 2017.
European Search Report Corresponding to Application 171538895 dated Jul. 17, 2017.
European Search Report Corresponding to Application 171632219 dated Aug. 22, 2017.
European Office Action Corresponding to Application 171529209 dated Sep. 21, 2018.
European Office Action Corresponding to Application 171632235 dated Apr. 2, 2019.
European Office Action Corresponding to Application 171529209 dated Jul. 1, 2019.
Japanese Office Action Corresponding to Application 2017-052026 dated May 8, 2018.
Japanese Office Action Corresponding to Application 2017050699 dated Dec. 4, 2018.

(56) References Cited

OTHER PUBLICATIONS

Japanese Office Action issued in connection with JP Application No. 2017-009052 dated Feb. 20, 2018.
Machine Translation and Notifications of Reasons for Refusal in Connection with Corresponding JP Application No. 2017/052026 dated Apr. 27, 2018.
Machine Translation and Notification of Reasons for Refusal Issued in Connection with Corresponding JP Application No. 2017-009053 dated Feb. 20, 2018.
Machine Translation and First Office Action and Search Issued in Connection with Corresponding CA Application No. 2955395 dated Jan. 31, 2018.
Machine Translation and Office Action and Search Issued in Connection with Corresponding CA Application No. 2960906 dated Feb. 9, 2018.
Machine Translation and Office Action and Search Issued in Connection with Corresponding CA Application No. 2960920 dated Apr. 30, 2018.
Machine Translation and First Office Action and Search Issued in Connection with Corresponding CN Application No. 201710056310.9 dated Jan. 22, 2018.
Machine Translation and First Office Action and Search Issued in Connection with Corresponding CN Application No. 20170205149.7 dated Aug. 3, 2018.
European Search Report Issued in Connection with Corresponding EP Application No. 17153589.1 dated Jun. 8, 2017.
EP Search Report and Written Opinion Issued in Connection with Corresponding EP Application No. 17163223.5 dated Aug. 7, 2017.
Cotta Transmission Company LLC, Technical: Efficiency and Heat Rejection http://www.cotta.com/efficiency-and-heat-rejection.
NASA, Static Pressure Measurement, Mar. 1, 2014, 2 pages.
Kampf, Why Do Turbofan Engines Have Low Pressure Compressors, Aviation Stack Exchange, Sep. 2015, 2 Pages.

* cited by examiner

VALVED AIRFLOW PASSAGE ASSEMBLY FOR ADJUSTING AIRFLOW DISTORTION IN GAS TURBINE ENGINE

FIELD OF THE INVENTION

The present subject matter relates generally to gas turbine engines and more particularly to a valved airflow passage assembly for adjusting airflow distortion in a gas turbine engine.

BACKGROUND OF THE INVENTION

A gas turbine engine generally includes a core having, in serial flow order, a compressor section, a combustion section, a turbine section, and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the compressor section and is then routed through the exhaust section, e.g., to atmosphere.

During operation, the gas turbine engine may encounter airflow distortion in the engine airflow path upstream of the compressor section, such as a circumferential or local flow disruption due to the angle of attack of the gas turbine engine, a cross wind, or any other inlet anomaly. Airflow distortion can be so uneven during operation as to put portions of the compressor section at or below proper stall pressure ratios. In many cases, sufficient stall margin should be maintained in the compressor section in order to prevent stall conditions from occurring during operation of the gas turbine engine.

One approach to maintaining a desired stall margin in a gas turbine engine is to close the variable guide vanes at the inlet to the compressor section, thereby reducing air flow and pressure in the compressor section below a pressure sufficient to cause stall conditions. However, closing the variable guide vanes can decrease the overall efficiency of the gas turbine engine.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a core engine of a gas turbine engine. The core engine includes a compressor section, a combustion section, and a turbine section in series flow. The compressor section, combustion section, and turbine section can define at least in part an engine airflow path for the gas turbine engine. The compressor section can include a compressor. The core engine can further include a valved airflow passage assembly. The valved airflow passage assembly can include a duct. The duct can define an inlet in airflow communication with the engine airflow path at a location downstream of the compressor. The duct can further define an outlet in airflow communication with the engine airflow path at a location upstream of the compressor. The duct can include an airflow passage extending between the inlet and outlet. The valved airflow passage assembly can also include a valve operable with the airflow passage for controlling an airflow through the airflow passage.

Another example aspect of the present disclosure is directed to a method for adjusting airflow distortion in a gas turbine engine. The gas turbine engine can include a compressor section, a combustion section, and a turbine section in series flow. The compressor section, combustion section, and turbine section can define at least in part an engine airflow path. The compressor section can include a compressor. The method includes determining, by one or more control devices, an airflow distortion condition associated with the engine airflow path upstream of the compressor. The method can further include controlling, by the one or more control devices, a valve of a valved airflow passage assembly to adjust the airflow distortion condition of the gas turbine engine. The valved airflow passage assembly can include a duct. The duct can define an inlet in airflow communication with the engine airflow path at a location downstream of the compressor. The duct can further define an outlet in airflow communication with the engine airflow path at a location upstream of the compressor. The duct can include an airflow passage extending between the inlet and outlet.

Other example aspects of the present disclosure are directed to gas turbine engines, devices, apparatus, and other systems configured to adjust airflow distortion in the airflow path of a gas turbine engine. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
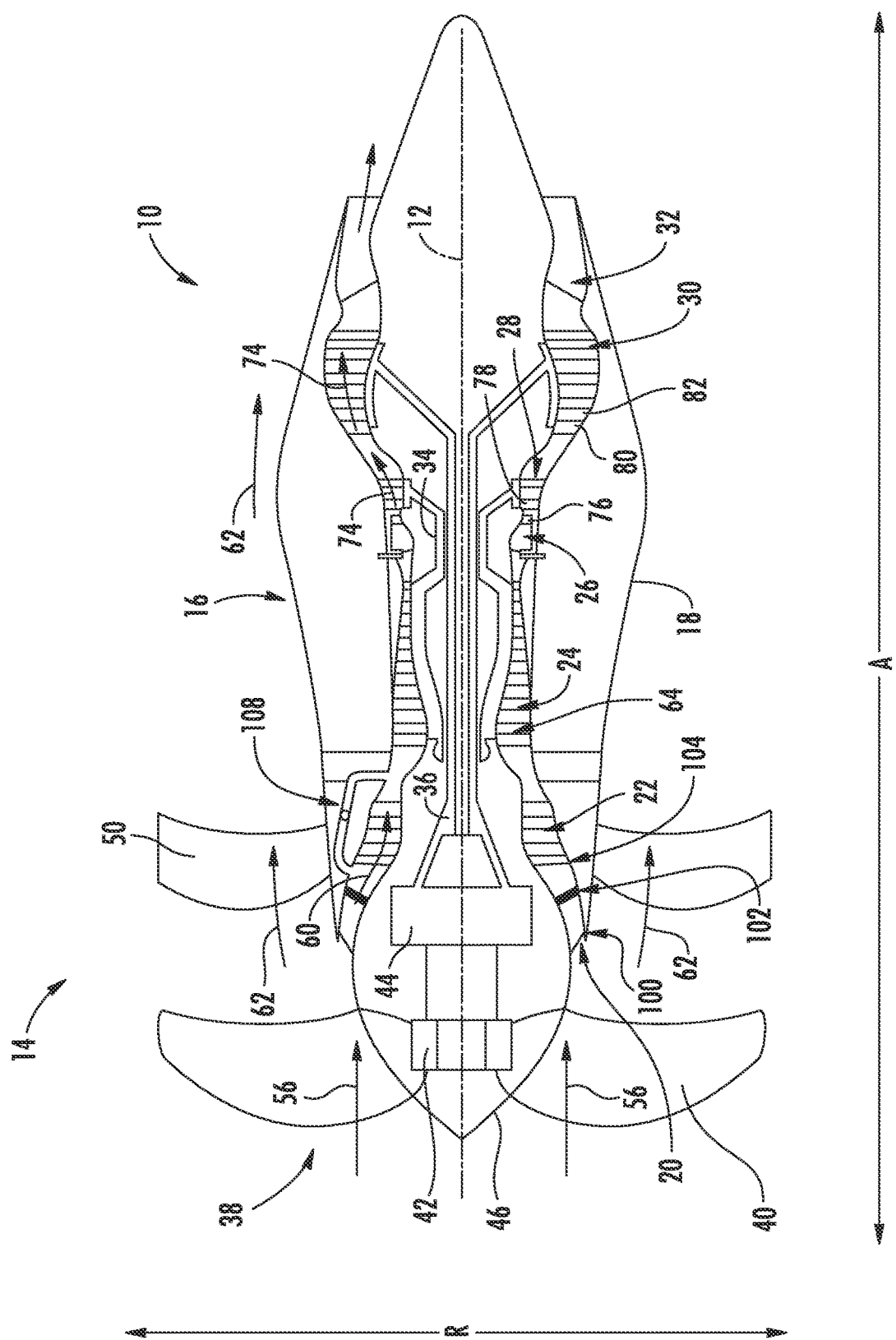
FIG. 1 is a schematic, cross-sectional view of a gas turbine engine according to example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the present disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to adjusting airflow distortion in a gas turbine engine in real-time. Airflow distortion can be so uneven during operation of the gas turbine engine as to put portions of the compressor section at or below proper stall pressure ratios, thereby reducing the operability of the gas turbine engine. Increased stall margin headroom can therefore be necessary to account for airflow distortion. One method for increasing stall margin headroom is to close the variable guide vanes at the inlet to the compressor section, thereby reducing air pressure and air flow in the compressor section of the gas turbine engine. However, closing down the variable guide vanes to increase stall margin headroom can decrease the overall efficiency of the gas turbine engine.

The gas turbine engine and method according to example aspects of the present disclosure can increase the operability of the aircraft's gas turbine engine by making a real-time assessment of airflow distortion in the engine airflow path of the gas turbine engine and adjusting the airflow distortion in the engine airflow path of the gas turbine engine by operating one or more valved airflow passage assemblies to route compressed air from downstream of the compressor section to the engine airflow path upstream of the compressor section based on the airflow distortion assessment. Real-time pressure measurements obtained from the engine airflow path can be used to make an assessment of distortion conditions in the engine airflow path of the gas turbine engine. Airflow distortion in a particular area of the engine airflow path can then be adjusted by opening or closing the valve of one or more valved airflow passage assemblies to route compressed air into the engine airflow path to energize areas experiencing distortion, such as local flow separation. By adjusting the airflow distortion in the engine airflow path, the operability of the gas turbine engine can be improved.

According to particular aspects of the present disclosure, a plurality of valved airflow passage assemblies can be included in a gas turbine engine. Each valved airflow passage assembly can include an inlet at a location downstream of the compressor section of the gas turbine engine and an outlet at a location upstream of the compressor section. A duct, or airflow passage, can extend between the inlet and outlet, and a valve can be included within the airflow passage for controlling airflow through the airflow passage. Each valved airflow passage assembly can be controlled to route compressed air from downstream of the compressor into the engine airflow path upstream of the compressor in response to airflow distortion. For example, in one embodiment, one or more pressure sensing devices can be integrated into various components that extend into the engine airflow path of the gas turbine engine. The pressure sensing devices can be configured to take pressure measurements associated with each valved airflow passage assembly. A distortion condition assessment can be made based on the real-time pressure measurements obtained from the pressure sensing devices. For example, a non-uniform pressure profile across engine airflow path can indicate that airflow distortion is present in the engine airflow path. A valved airflow passage assembly can then be controlled to adjust the airflow distortion condition associated with the engine airflow path. For example, a valved airflow passage assembly can be controlled to route compressed air from downstream of the compressor section into an area of the engine airflow path experiencing local flow separation to energize that area of the engine airflow path and mitigate the local flow separation.

In this way, the gas turbine engine and method according to example aspects of the present disclosure can have a technical effect of adjusting the airflow distortion of the gas turbine engine based on real-time airflow distortion conditions. Further, this can allow an increase in the operability of the gas turbine engine by increasing the stall margin headroom available for operational safety.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the term "optimization" or "optimized" refers to determining an enhanced operating state with respect to a prior operating state. For example, the enhanced operating state may be more efficient, reduce fuel consumption, reduce the time required to perform an action, or increase safety.

Referring now to the drawings, wherein identical numerals indicate the same elements throughout the figures, FIG. 1 is a schematic cross-sectional view of a gas turbine engine in accordance with an example embodiment of the present disclosure. More particularly, for the embodiment of FIG. 1, the gas turbine engine is a high-bypass turbofan jet engine 10, referred to herein as "gas turbine engine 10." Example aspects of the present disclosure can be used with other suitable gas turbine engines without deviating from the scope of the present disclosure.

As shown in FIG. 1, the gas turbine engine 10 defines an axial direction A (extending parallel to a longitudinal centerline 12 provided for reference) and a radial direction R. The gas turbine engine 10 also defines a circumferential direction (not depicted). In general, the gas turbine engine 10 includes a fan section 14 and a core engine 16, the fan section 14 configured in mechanical communication and positioned in flow communication with the core engine 16.

The example core engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal centerline 12 by LP shaft 36 across a power gear box 44. The power gear box 44 includes a plurality of gears for adjusting the rotational speed of the LP shaft 36. Additionally, for the embodiment depicted, the disk 42 of the variable pitch fan 38 is covered by a rotatable front hub 46 aerodynamically contoured to promote an airflow through the plurality of fan blades 40.

Referring still to the example gas turbine engine 10 of FIG. 1, the example gas turbine engine 10 additionally includes a plurality of circumferentially-spaced outlet guide vanes 50. The plurality of outlet guide vanes 50 are positioned downstream from the fan 38 along the axial direction A and extend outwardly from the outer casing 18 of the core engine 16 generally along the radial direction R. Each outlet guide vane 50 defines a center of pressure 52 (shown in FIG. 2) and a pitch axis P extending substantially parallel to the radial direction R. Notably, for the embodiment depicted, the gas turbine engine 10 does not include any outer casing enclosing the fan section 14 and/or outlet guide vanes 50. Accordingly, for the embodiment depicted, the gas turbine engine 10 may be referred to as an un-ducted single fan gas turbine engine 10.

For the example gas turbine engine 10 depicted, the fan section 14, or more particularly, the rotation of the fan blades 40 of the fan section 14, provides a majority of the propulsive thrust of the gas turbine engine 10. Additionally, the plurality of outlet guide vanes 50 are provided to increase an efficiency of the fan section 14 as well as to provide other benefits, such as, for example, decreasing an amount of noise generated by the gas turbine engine 10.

During operation of the gas turbine engine 10, a volume of air 56 passes over the plurality of blades 40 of the fan section 14. A first portion of the volume of air 56, i.e., the first portion of air 60, is directed or routed into an engine airflow path 64 extending through the compressor section, the combustion section 26, the turbine section, and the exhaust section 32. Additionally, a second portion of the volume of air 56, e.g., a second portion of air 62, flows around the core engine 16, bypassing the core engine 16. The second portion of air 62 may also be referred to as a bypass airflow. The ratio between the second portion of air 62 and the first portion of air 60 is commonly known as a bypass ratio.

Referring still to FIG. 1, the pressure of the first portion of air 60 is increased as it is routed through the LP compressor 22 and subsequently through the HP compressor 24. The compressed first portion of air 60 is then provided to the combustion section 26, where it is mixed with fuel and burned to provide combustion gases 74. The combustion gases 74 are routed through the HP turbine 28 where a portion of thermal and/or kinetic energy from the combustion gases 74 is extracted via sequential stages of HP turbine stator vanes 76 that are coupled to the outer casing 18 and HP turbine rotor blades 78 that are coupled to the HP shaft or spool 34, thus causing the HP shaft or spool 34 to rotate, thereby supporting operation of the HP compressor 24. The combustion gases 74 are then routed through the LP turbine 30 where a second portion of thermal and kinetic energy is extracted from the combustion gases 74 via sequential stages of LP turbine stator vanes 80 that are coupled to the outer casing 18 and LP turbine rotor blades 82 that are coupled to the LP shaft or spool 36, thus causing the LP shaft or spool 36 to rotate, thereby supporting operation of the LP compressor 22 and/or rotation of the fan 38. The combustion gases 74 are subsequently routed through the jet exhaust nozzle section 32 of the core engine 16 to provide propulsive thrust to supplement propulsive thrust provided by the fan section 14.

Referring still to FIG. 1, downstream of an annular inlet 20 is one or more inlet guide vanes 100. In certain example embodiments, inlet guide vane 100 may be configured to open or close, thereby restricting the flow of the first portion of air 60 into the engine airflow path 64 extending through the compressor section. In certain example embodiments, inlet guide vane 100 can be an instrumented guide vane 400 according to example embodiments of the present disclosure as depicted, for instance, in FIGS. 5 and 6.

Downstream of inlet guide vane 100 is one or more struts 102 configured to mechanically couple outer casing 18 to the core engine 16. Strut 102 extends into the engine airflow path 64 where first portion of air 60 flows over strut 102. In certain example embodiments, strut 102 is configured to obtain pressure measurements. Downstream of strut 102 is one or more variable guide vanes 104. Variable guide vanes 104 are configured to open or close, thereby restricting the flow of the first portion of air 60 into the engine airflow path 64 extending through the compressor section. In certain example embodiments, variable guide vane 104 can be an instrumented variable guide vane 400 according to example embodiments of the present disclosure as shown, for instance, in FIGS. 5 and 6.

Referring still to FIG. 1, a valved airflow passage assembly 108 is in airflow communication with engine airflow path 64 upstream of LP compressor 22 as well as downstream of LP compressor 22. In one embodiment, valved airflow passage assembly 108 can be opened to route compressed air from downstream of LP compressor 22 to upstream of LP compressor 22 to improve the operability of gas turbine engine 10, increase the stall margin of LP compressor 22, or mitigate airflow mismatch between LP compressor 22 and HP compressor 24. Airflow mismatch can occur because fans, such as variable pitch fan 38 in gas turbine engine 10, may operate within a narrow speed range, which may be elevated. In such configurations, low pressure compressors, such as LP compressor 22, may operate at a similarly elevated speed because they are mechanically coupled to the variable pitch fan through a gearbox. In low power conditions, a low pressure compressor, such as LP compressor 22, may pump too much airflow for a high pressure compressor, such as HP compressor 24, to accept. Variable bleed valves can be used to mitigate airflow mismatch by bleeding a portion of the airflow from downstream of a low pressure compressor, such as LP compressor 22, thereby allowing the low pressure compressor to pump additional airflow and improve the stall margin of the LP compressor.

Figure 2:
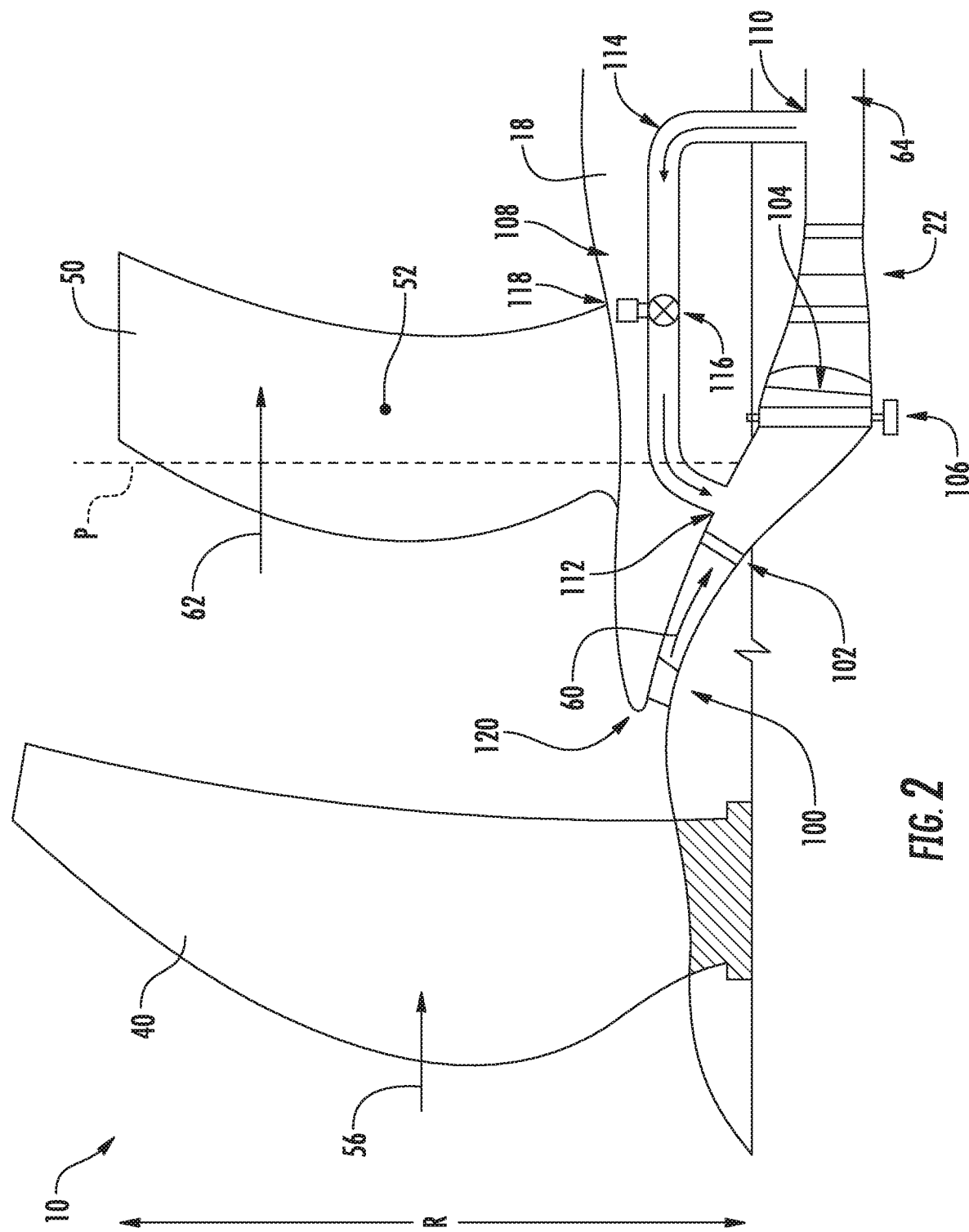
FIG. 2 is schematic, cross-sectional view of a forward end of an example gas turbine engine according to example embodiments of the present disclosure.

Referring now to FIG. 2, a close-up, cross-sectional view of a forward end of the example gas turbine engine 10 of FIG. 1 according to example aspects of the present disclosure is provided. As shown, a first portion of air 60 enters engine airflow path 64 through inlet 20 (depicted in FIG. 1) at a forward end 120 of the core engine 18. As shown, the gas turbine engine 10 includes at least one control mechanism 106 configured to adjust a variable guide vane 104. In certain example embodiments, the gas turbine engine 10 may include a plurality of control mechanisms 106, each individual control mechanism 106 configured to adjust an individual variable guide vane 104 or other member of the airflow path.

Referring still to FIG. 2, valved airflow passage assembly 108 includes an inlet 110 in airflow communication with engine airflow path 64 at a location downstream of LP compressor 22. Valved airflow passage assembly 108 also includes an outlet 112 in airflow communication with engine airflow path 64 at a location upstream of LP compressor 22. Valved airflow passage assembly 108 also includes an airflow passage 114 extending between inlet 110 and outlet 112. Valved airflow passage assembly 108 also includes a valve 116 operable with airflow passage 114 to control an airflow through airflow passage 114. Valve 116 can include one or more actuators 118 for opening or closing valve 116 in response to a signal from a control device, such as, for instance, control device 600 depicted in FIG. 7. As shown, valve 116 is located within airflow passage 114. Additionally and/or in the alternative, valve 116 can be located proximate to inlet 110 or proximate to outlet 112. During operation of gas turbine engine 10, valve 116 can be opened such that compressed air from downstream of LP compressor 22 can enter inlet 110, travel through airflow passage 114, and exit outlet 112 into the engine airflow path 64 upstream of LP compressor 22. Valve 116 can also be closed such that substantially all airflow through airflow passage 114 is stopped when valve 116 is in the closed position. In another embodiment, valve 116 can be adjusted to one or more intermediate positions such that a portion of airflow is restricted through airflow passage 114 in order to vary the amount of airflow that flows through airflow passage 114.

Figure 3:
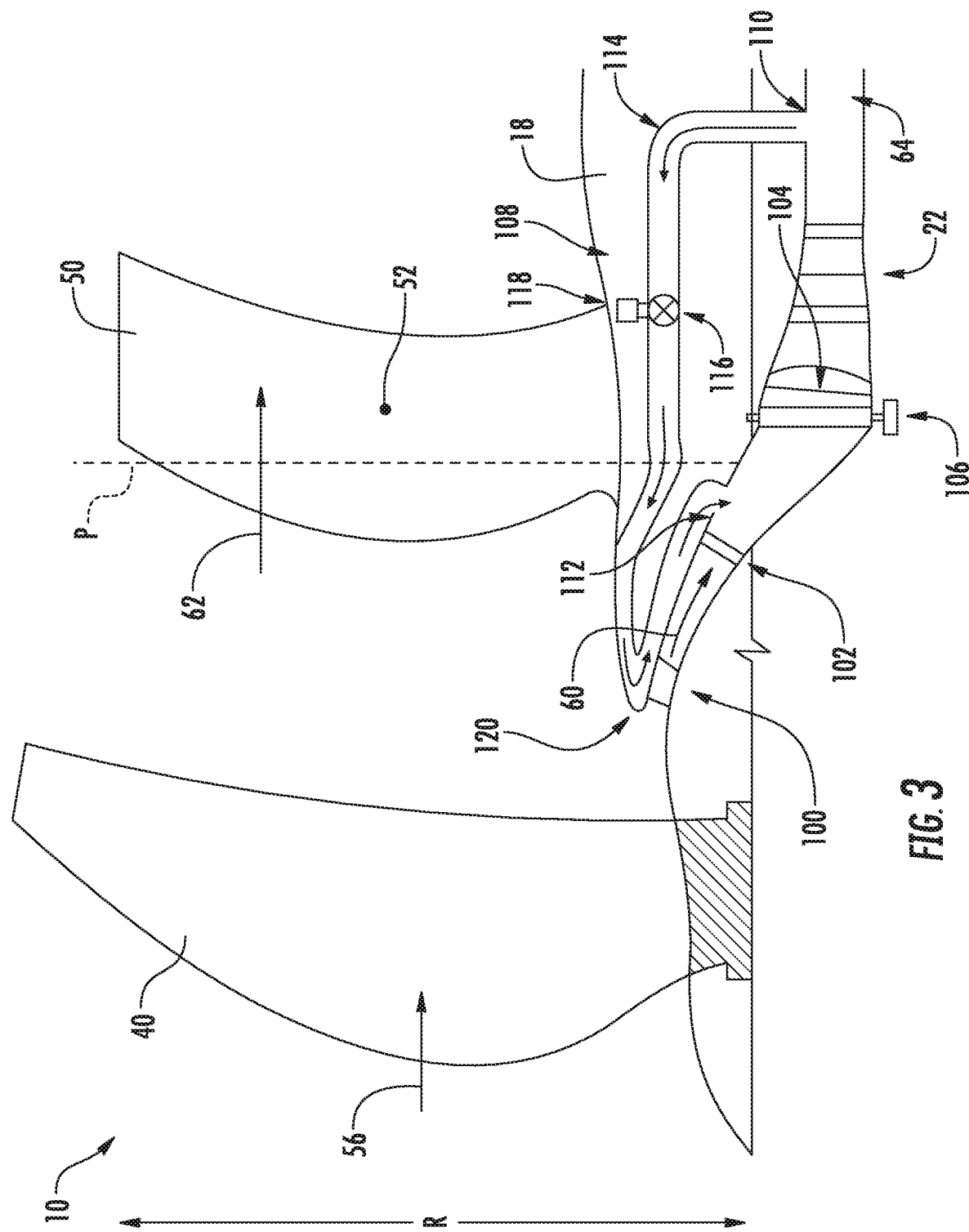
FIG. 3 is schematic, cross-sectional view of a forward end of an example gas turbine engine according to example embodiments of the present disclosure.

Referring now to FIG. 3, the same forward end of gas turbine engine 10 depicted in FIG. 2 is shown according to additional example aspects of the present disclosure. Structures that are the same or similar to those shown in FIG. 2 are referred to with the same reference numerals. As shown, a first portion of air 60 enters engine airflow path 64 through inlet 20 (depicted in FIG. 1) at a forward end 120 of the core engine 18. As depicted in FIG. 3, valved airflow passage assembly 108 includes an inlet 110 in airflow communication with engine airflow path 64 at a location downstream of LP compressor 22. Valved airflow passage assembly 108 also includes an outlet 112 in airflow communication with engine airflow path 64 at a location upstream of LP compressor 22. Valved airflow passage assembly 108 also includes an airflow passage 114 extending between inlet 110 and outlet 112. Valved airflow passage assembly 108 also includes a valve 116 operable with airflow passage 114 to control an airflow through airflow passage 114. Valve 116 can include one or more actuators 118 for opening or closing valve 116 in response to a signal from a control device, such as, for instance, control device 600 depicted in FIG. 7. As shown, valve 116 is located within airflow passage 114. Additionally and/or in the alternative, valve 116 can be located proximate to inlet 110 or proximate to outlet 112.

As depicted in FIG. 3, airflow passage 114 is configured to route compressed air from inlet 110 through the forward end 120 of core engine 18 before exiting through outlet 112. According to example aspects of the present disclosure, valved airflow passage assembly 108 can be integrated with a booster anti-ice (BAI) subsystem to prevent ice buildup and remove ice on the forward end 120 of core engine 18. During operation of gas turbine engine 10, valve 116 can be opened such that compressed air from downstream of LP compressor 22 can enter inlet 110, travel through airflow passage 114, and exit outlet 112 into the engine airflow path 64 upstream of LP compressor 22. Valve 116 can also be closed such that substantially all airflow through airflow passage 114 is stopped when valve 116 is in the closed position. In another embodiment, valve 116 can be adjusted to one or more intermediate positions such that a portion of airflow is restricted through airflow passage 114 in order to vary the amount of airflow that flows through airflow passage 114. As valve 116 is opened or closed, compressed air from downstream of LP compressor 22 is routed through airflow passage 114. According to example aspects of the present disclosure, airflow passage 114 can be configured such that thermal energy from compressed air routed through airflow passage 114 can be transferred to the forward end 120 of core engine 18 as part of an integrated BAI subsystem, thereby preventing and/or removing ice buildup on the forward end 120 of core engine 18. For example, in the embodiment depicted, the airflow passage 114 extends directly adjacent to a surface of the core engine 18, or rather to an exposed surface of the forward end 120 of the core engine 18, such that an airflow through airflow passage 114 is in thermal communication with the exposed surface of the forward end 120.

Referring now to FIGS. 2 and 3, during operation of gas turbine engine 10, valve 116 can be configured to be controlled to adjust airflow distortion in engine airflow path 64. For instance, a control device, such as control device 600 shown in FIG. 7, can obtain measurements from one or more pressure sensor devices, and determine that an area of the engine airflow path is experiencing airflow distortion, such as airflow separation. The control device can then control valved airflow passage assembly 108 to adjust the airflow distortion, by, for example, sending a control signal to actuator 118 to open or close valve 116 to route compressed air from downstream of LP compressor 22 to the engine airflow path 64 upstream of LP compressor 22. In this way, airflow distortion in a gas turbine engine can be adjusted, and moreover, reduced, thereby improving operability of the gas turbine engine.

Additionally, a valved airflow passage assembly according to example aspects of the present disclosure wherein compressed air from downstream of a low pressure compressor is recirculated can provide the airflow mismatch mitigation benefits of a variable bleed valve by allowing the low pressure compressor, such as LP compressor 22, to operate at a higher airflow rate. Additionally, running the low pressure compressor, such as LP compressor 22, at a higher airflow rate during flight conditions that are likely to induce distortion, such as during takeoff, can allow the low pressure compressor to be less sensitive to distortion induced operability issues.

Figure 5:
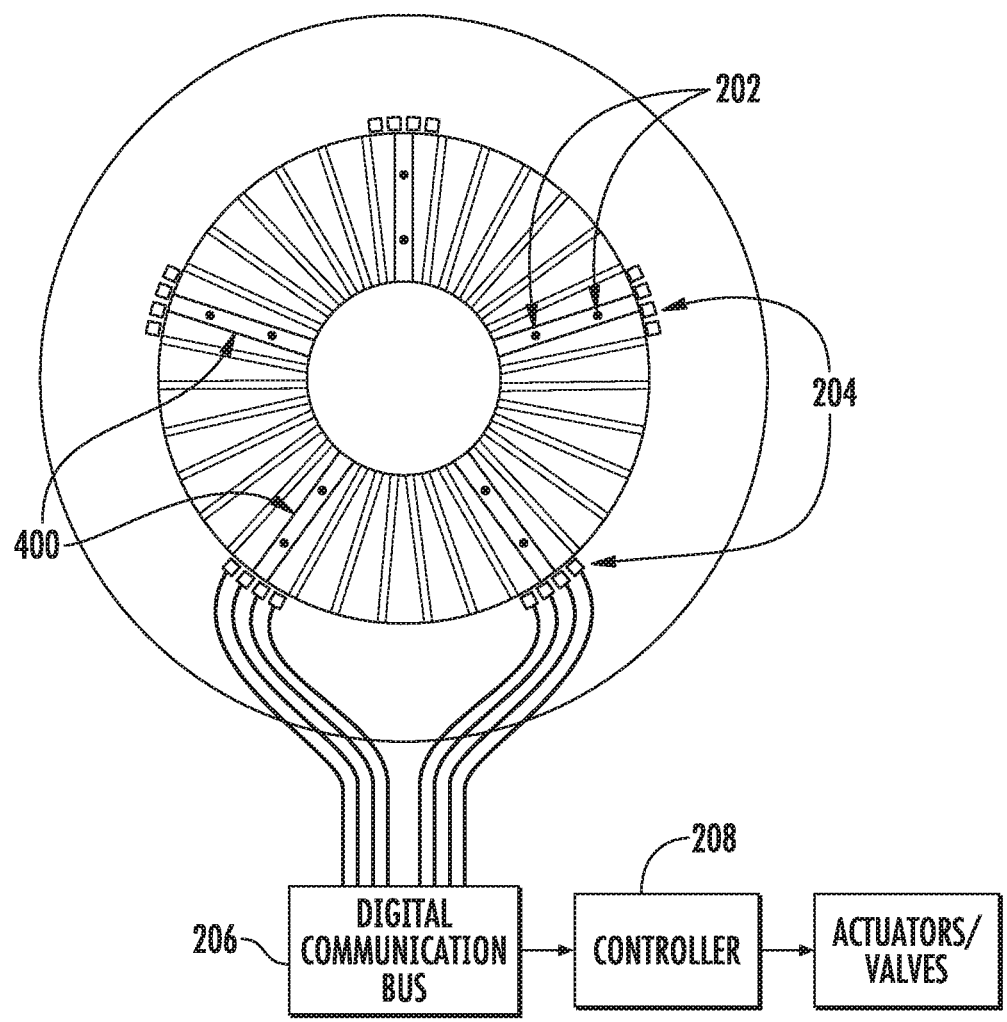
FIG. 5 is a schematic, axial view of an array of instrumented guide vanes in an example gas turbine engine according to example embodiments of the present disclosure.
Figure 6:
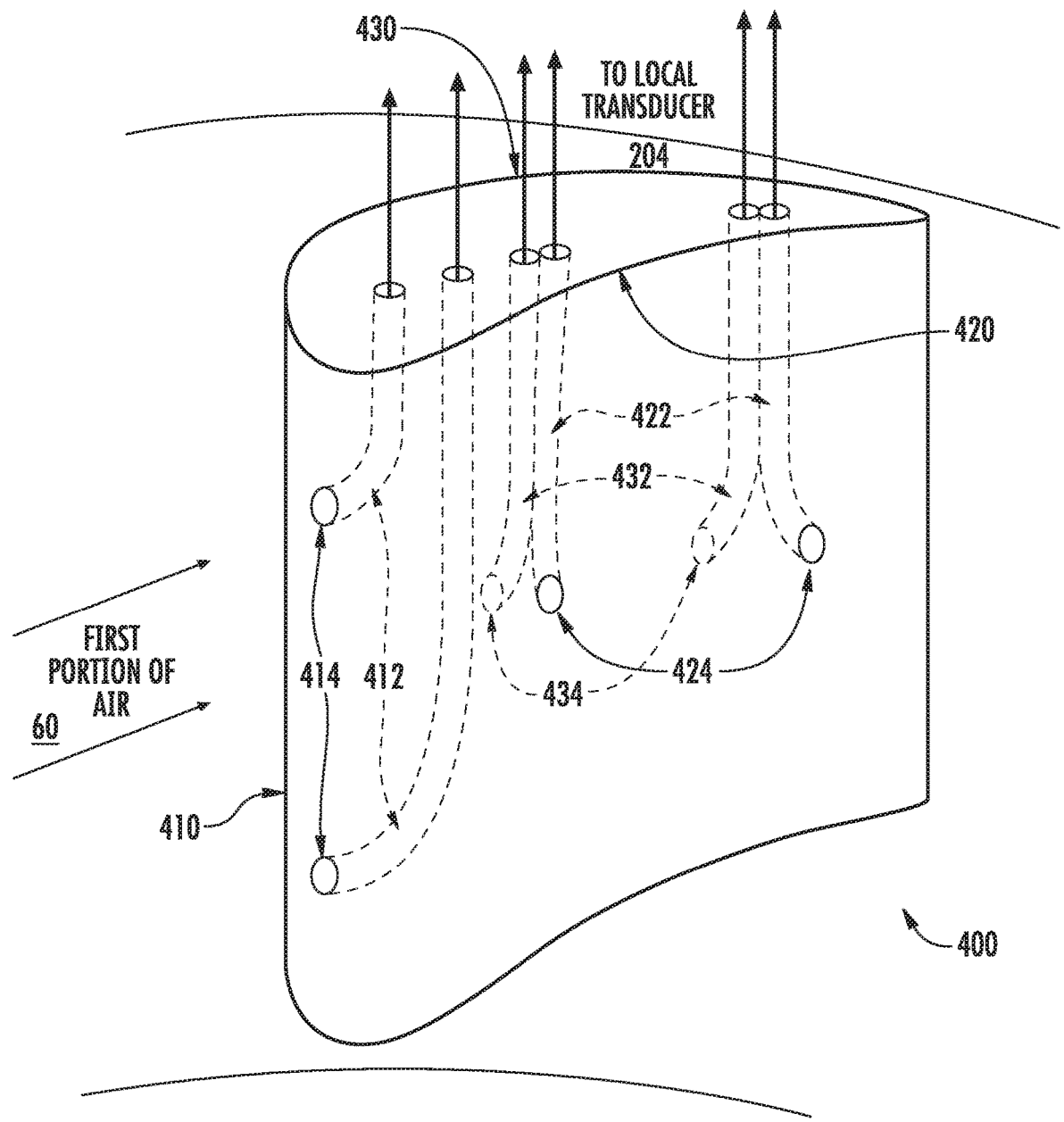
FIG. 6 is a schematic of an individual instrumented guide vane in an example gas turbine engine according to example embodiments of the present disclosure.

In one embodiment, one or more pressure sensor devices can be located at least partially within engine airflow path 64 at a location upstream of LP compressor 22. In an embodiment, the one or more pressure sensor devices can be at least partially integrated into one or more members in the engine airflow path 64, such as an instrumented guide vane 400 as shown in FIGS. 5 and 6. In another embodiment, the one or more pressure sensor devices can be integrated into inlet guide vane 100 or strut 102. Other pressure sensor devices can also be used without departing from the scope or spirit of the present disclosure. Using measurements obtained by the one or more pressure sensor devices, an airflow distortion assessment can be determined.

Figure 4:
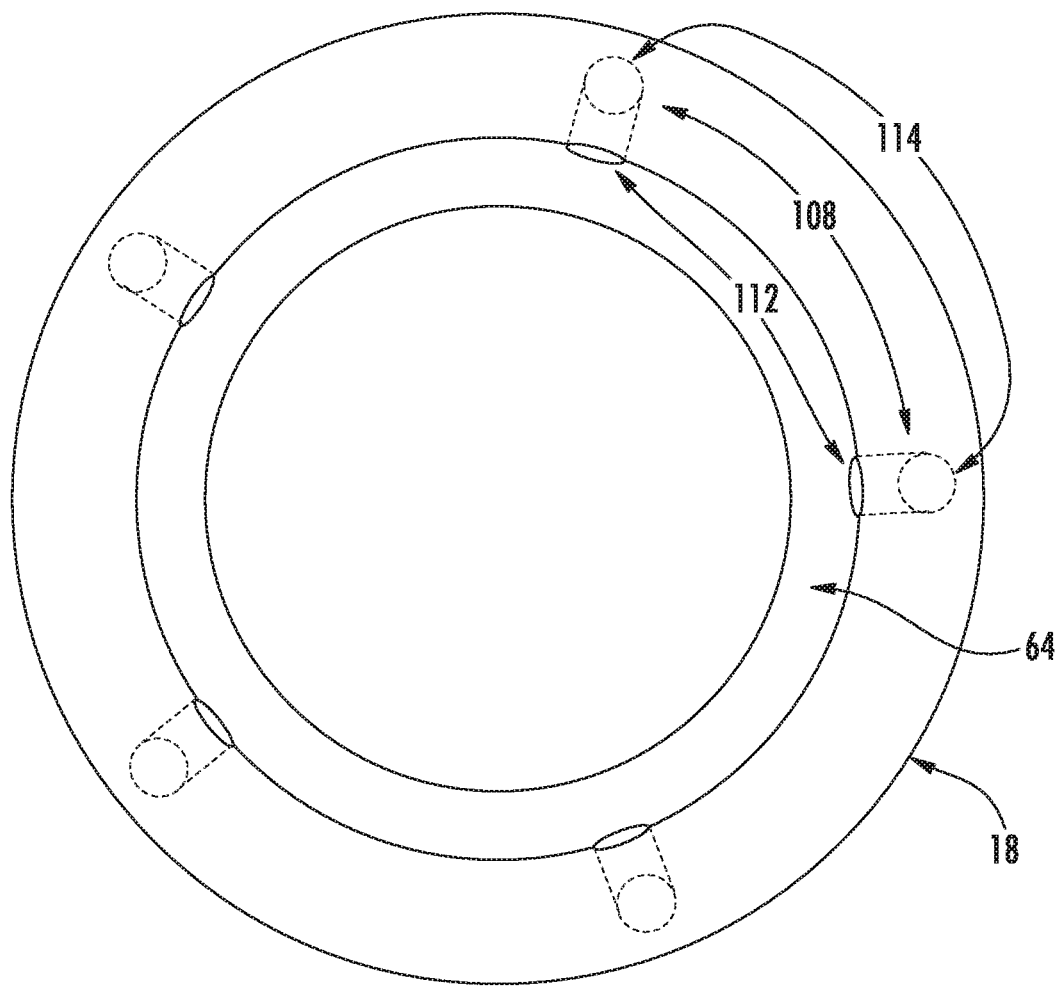
FIG. 4 is an axial view of a plurality of valved airflow passage assemblies in an example gas turbine engine according to example embodiments of the present disclosure.

Referring now to FIG. 4, an axial view of a plurality of valved airflow passage assemblies 108 in an example gas turbine is shown. As shown, five valved airflow passage assemblies 108 are spaced about the circumferential direction of gas turbine engine 10. In another embodiment, any number of valved airflow passage assemblies 108 can be included in gas turbine engine 10. As shown, outer casing 18 encloses core engine 16. Each valved airflow passage assembly 108 is located within outer casing 18. As shown, each valved airflow passage assembly 108 includes an outlet 112 in airflow communication with engine airflow path 64. Each valved airflow passage assembly also includes an airflow passage 114 depicted in phantom. In an embodiment, each valved airflow passage assembly 108 can be controlled to adjust airflow distortion in engine airflow path 64 by opening or closing the valves (not shown) in each airflow passage assembly 108. In an embodiment, each valved airflow passage assembly 108 can be associated with one or more pressure sensing devices. For example, gas turbine engine 10 can include a plurality of instrumented guide vanes 400 spaced about the circumferential direction of gas turbine engine 10 as depicted in FIG. 5. Each valved airflow passage assembly 108 can have one or more instrumented guide vanes 400 associated with each valved airflow passage assembly 108 such that the one or more instrumented guide vanes 400 can obtain measurements from the engine airflow path 64 in close proximity to each valved airflow passage assembly 108.

Referring now to FIG. 5, a schematic, axial view of an array of individual guide vanes 104 in the example gas turbine engine of FIG. 1 is shown. As shown, a plurality of individual guide vanes 104 are configured in a circumferential array located in the engine airflow path 64 upstream of the LP Compressor 22. As depicted in FIG. 5, five instrumented guide vanes 400, as discussed below in greater detail with respect to FIG. 6, are included in the array of individual guide vanes 104. As will be discussed in greater detail below with reference to FIG. 6, each individual instrumented guide vane 400 is configured with a pressure sensing device. As shown in FIG. 5, the pressure sensing device includes one or more taps 202 extending through the individual instrumented guide vane 400 and one or more local transducers 204 configured to measure an air pressure from the one or more taps 202. However, it will be apparent to those skilled in the art will that the pressure sensing device can be any suitable device configured to sense pressure without departing from the scope or spirit of the present disclosure. As shown in FIG. 5, local transducer 204 is configured to send data indicative of an air pressure to a digital communication bus 206. Digital communication bus 206 then sends the data indicative of an air pressure to controller 208. In an embodiment, controller 208 can be a control device programmed to perform operations, such as control device 600 depicted in FIG. 7. Controller 208 can control various actuators and valves based on the data indicative of an air pressure, such as valve 116 and actuator 118 of a valved airflow passage assembly 108.

FIG. 6 is a schematic of an individual instrumented guide vane 400 for an example gas turbine engine according to example embodiments of the present disclosure. Instrumented guide vane 400 can be a variable guide vane 104 or a stationary guide vane 100. As depicted in FIG. 6, instrumented guide vane 400 can be configured in a nonsymmetrical airfoil shape generally having a "tear drop" shape with a leading edge 410, a pressure side 420, and a suction side 430. However, in other example embodiments, the instrumented guide vane 400 may instead define any other suitable symmetrical or nonsymmetrical shape or configuration. In some implementations, leading edge 410 can be configured within engine airflow path 64 such that first portion of air 60 flowing downstream of annular inlet 20 first comes into contact with leading edge 410 before flowing over pressure side 420 and suction side 430 and continuing into LP compressor 22.

Referring still to FIG. 6, one or more leading edge taps 412, pressure side taps 422 and/or suction side taps 432 are integrated into instrumented guide vane 400. The leading edge taps 412, pressure side taps 422, and suction side taps 432 are depicted in phantom. As depicted in FIG. 6, two leading edge inlets 414 are spaced radially along leading edge 410 to allow air from first portion of air 60 to enter leading edge inlet 414 and flow through leading edge tap 412 to a local transducer 204 (not shown in FIG. 6). In another embodiment, a single leading edge inlet 414 and leading edge tap 412 can be integrated into leading edge 410. In another embodiment three or more leading edge inlets 414 and leading edge taps 412 can be integrated into leading edge 410.

Referring still to FIG. 6, two pressure side inlets 424 are spaced axially along pressure side 420 to allow air from first portion of air 60 to enter pressure side inlet 424 and flow through pressure side tap 422 to a local transducer 204 (not shown in FIG. 6). In another embodiment, a single pressure side inlet 424 and pressure side tap 422 are integrated into pressure side 420. In another embodiment three or more pressure side inlets 424 and pressure side taps 422 are integrated into pressure side 420.

Referring still to FIG. 6, two suction side inlets 434 are spaced axially along suction side 430 to allow air from first portion of air 60 to enter suction side inlet 434 and flow through suction side tap 432 to a local transducer 204 (not shown in FIG. 6). The suction side inlets 434 are depicted in phantom. In another embodiment a single suction side inlet 434 and suction side tap 432 are integrated into suction side 430. In another embodiment, three or more suction side inlets 434 and suction side taps 432 are integrated into suction side 430.

Referring still to FIG. 6, in an embodiment, local transducer 204 (not shown) can be configured to provide measurements of a pressure differential between a pressure side tap 422 and a suction side tap 432. In another embodiment, local transducer 204 (not shown) can be configured to provide measurements of absolute pressures from a pressure side tap 422 and a suction side tap 432.

Figure 7:
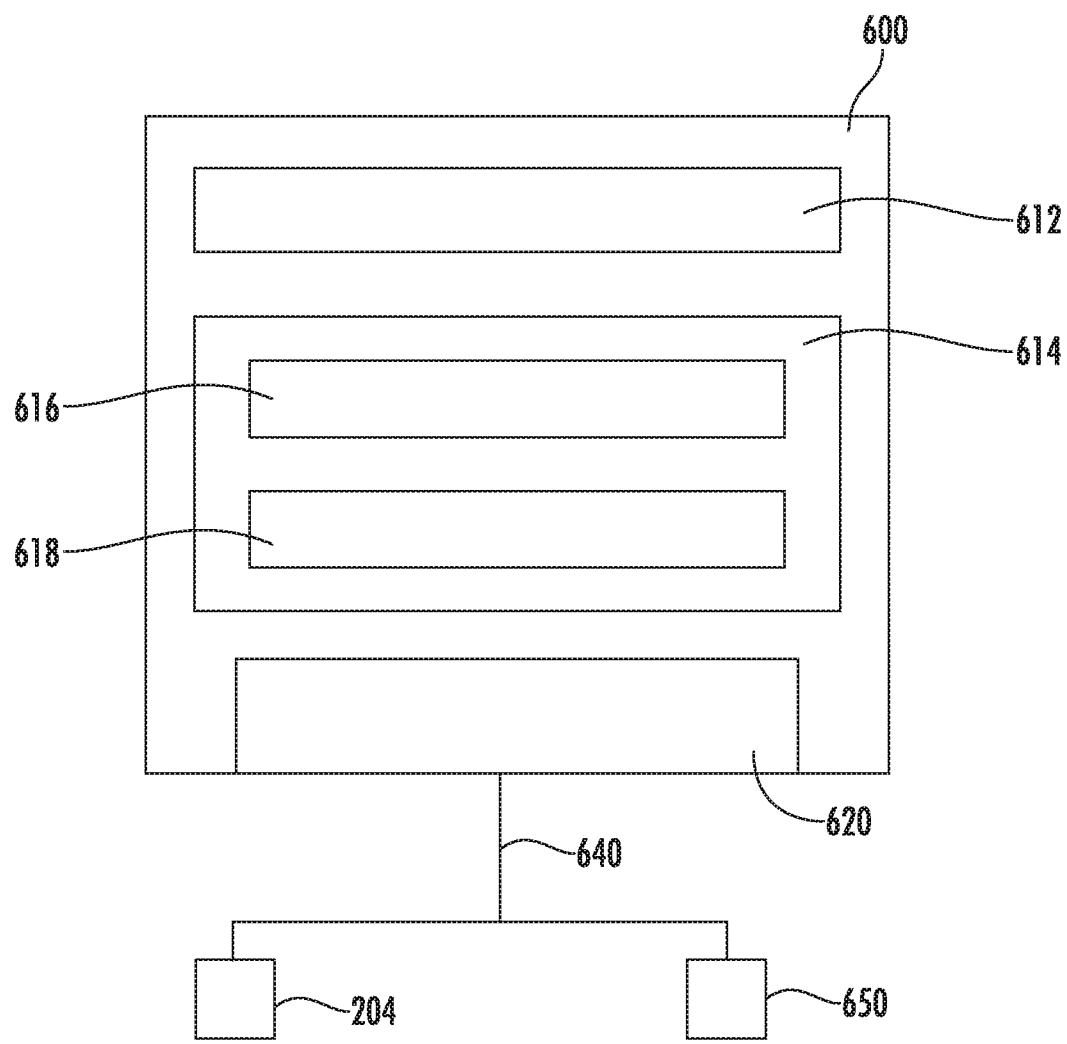
FIG. 7 depicts an example control device used in a control system according to example embodiments of the present disclosure.

FIG. 7 depicts an example control device used in a control system according to example embodiments of the present disclosure. As shown, the control device(s) 600 can include one or more processors 612 and one or more memory devices 614. The one or more processors 612 can include any suitable processing device, such as a microprocessor, microcontroller, integrated circuit, logic device, or other suitable processing device. The one or more memory devices 614 can include one or more computer-readable media, including, but not limited to, non-transitory computer-readable media, RAM, ROM, hard drives, flash drives, or other memory devices.

The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. The instructions 616 can be implemented in software written in any suitable programming language or can be implemented in hardware. In some embodiments, the instructions 616 can be executed by the one or more processors 612 to cause the one or more processors to perform operations, such as the operations for controlling a valved airflow passage assembly to adjust airflow distortion in a gas turbine engine as described with reference to FIG. 8.

Referring to FIG. 7, the memory devices 614 can further store data 618 that can be accessed by the processors 612. The data 618 can include, for instance, operating parameters, pressure measurements obtained from the engine airflow path, and other data. The data 618 can also include data associated with models and algorithms used to perform the example methods according to example aspects of the present disclosure, such as models and algorithms for determining a distortion condition.

The control device(s) 600 can further include a communications interface 620. The communications interface 620 can be configured to communicate with aircraft systems over a communication network 640. For instance, the communications interface 620 can receive data indicative of a pressure obtained by a pressure sensing device, such as a tap 202 and local transducer 204. In one embodiment, the communications interface 620 can provide control commands to an engine control system 650 that has one or more actuators to control various components of the gas turbine engine 10, such as, but not limited to, a valve 116 or actuator 118 of a valved airflow passage assembly 108. The communications interface 620 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 8:
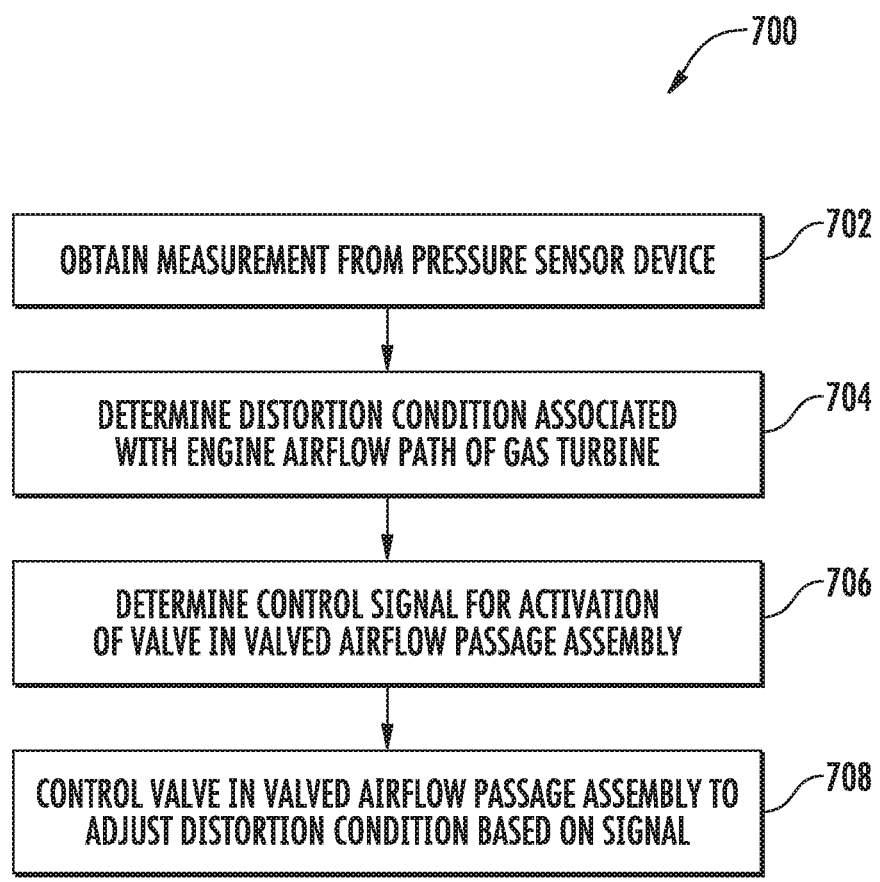
FIG. 8 depicts a flow diagram of an example method according to example embodiments of the present disclosure.

Referring now to FIG. 8, a flow diagram of an example method (700) according to example embodiments of the present disclosure is depicted. FIG. 8 can be implemented by one or more control devices, such as the control device 600 depicted in FIG. 7. In addition, FIG. 8 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (702), the method can include obtaining one or more measurements from one or more pressure sensor devices. The one or more measurements can be obtained by, for example, a local transducer 204 operatively connected to an instrumented guide vane 400 as shown in FIGS. 5 and 6. Alternatively, the one or more measurements can be obtained from any other suitable pressure sensor device.

At (704), the method can include determining a distortion condition associated with the engine airflow path of a gas turbine engine from the one or more measurements. For example, using the one or more measurements, a distortion condition can be determined, such as a local flow disruption in the engine airflow path 64 of the gas turbine engine 10 that causes portions of the LP compressor 22 to be at or below pressures sufficient to cause stall conditions.

At (706), the method can include determining a control signal for activation of a valve in a valved airflow passage assembly based at least in part on the distortion condition assessment. For example, a setpoint of a valve 116 in a valved airflow passage assembly 108 can be determined that will increase an airflow through the valved airflow passage assembly 108 in order to energize an area of the engine airflow path 64 that is experiencing a local flow disruption. A control signal representing the determined setpoint of the valve can then be sent to an actuator 118 in order to adjust the valve 116.

At (708), the method can include controlling the valve in the valved airflow passage assembly to adjust the distortion condition based on the control signal. For example, an actuator 118 can adjust a valve 116 based on the control signal. The valve of a valved airflow passage assembly can be then controlled to open or close to the determined setpoint to adjust the airflow distortion. In this way, a valved airflow passage assembly can adjust the airflow distortion associated with the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
a core engine downstream of a fan section, the core engine comprising:
a compressor section, a combustion section, and a turbine section in series flow, the compressor section, combustion section, and turbine section defining an engine airflow path for the gas turbine engine, the compressor section comprising a low pressure compressor and a high pressure compressor; and
a valved airflow passage assembly, comprising:
a duct, the duct defining an inlet at a location in the engine airflow path between the low pressure compressor and the high pressure compressor, the inlet in airflow communication with the engine airflow path, the duct further defining an outlet at a location in the engine airflow path upstream of the low pressure compressor, the outlet in airflow communication with the engine airflow path, the duct comprising an airflow passage extending between the inlet and outlet; and
a valve operable with the airflow passage for controlling an airflow through the airflow passage, wherein the valve is configured to be controlled based at least in part on an airflow distortion in the engine airflow path;

the core engine further comprising one or more pressure sensor devices located in one or more vanes or struts in the engine airflow path, upstream of the low pressure compressor and operable for obtaining one or more measurements associated with the airflow distortion.

2. The gas turbine engine of claim 1, wherein the core engine comprises a plurality of valved airflow passage assemblies.

3. The gas turbine engine of claim 2, wherein the one or more pressure sensor devices is a plurality of pressure sensor devices, wherein each valved airflow passage assembly is associated with a respective pressure sensor device of the plurality of pressure sensor devices configured to obtain the one or more measurements associated with the valved airflow passage assembly.

4. The gas turbine engine of claim 2, the core engine defining a circumferential direction, wherein the plurality of valved airflow passage assemblies are spaced about the circumferential direction of the core engine.

5. The gas turbine engine of claim 1, wherein the valve is located in the valved airflow passage.

6. The gas turbine engine of claim 1, wherein the valve includes one or more actuators for adjusting valve position.

7. The gas turbine engine of claim 1, wherein the valve is movable between an open position and a closed position, wherein the valve restricts substantially all airflow through the valved airflow passage assembly when in the closed position.

8. The gas turbine engine of claim 7, wherein the valve is movable to an intermediate position between the open position and the closed position, wherein the valve restricts a portion of airflow through the valved airflow passage when in the intermediate position.

9. The gas turbine engine of claim 8, wherein the valve is movable between the open, closed, and intermediate positions based on signals from a controller to adjust the airflow distortion in the engine airflow path.

10. The gas turbine engine of claim 1, wherein the valved airflow passage assembly is in thermal communication with a forward end of the core engine to prevent or remove ice buildup.

11. The gas turbine engine of claim 1, comprising:
a controller operably connected to the valve of the valved airflow passage assembly, the controller comprising one or more processors and one or more memory devices, the one or more memory devices storing instructions that when executed by the one or more processors cause the one or more processors to perform operations, the operations comprising:
determine the airflow distortion in the engine airflow path upstream of the compressor; and
control the valve to adjust the airflow through the airflow passage to adjust the determined airflow distortion.

12. The gas turbine engine of claim 1, wherein the core engine comprises a plurality of valved airflow passage assemblies, wherein the one or more pressure sensor devices comprise a plurality of pressure sensor devices, wherein at least one pressure sensor device is configured to measure a pressure associated with each valved airflow passage assembly.

13. The gas turbine engine of claim 1, wherein the valve includes one or more actuators for adjusting valve position, and wherein the one or more actuators are configured to respond to a signal from a control device.

14. The gas turbine engine of claim 1, wherein the gas turbine engine includes a plurality of control mechanisms.

15. The gas turbine engine of claim 1, wherein the gas turbine engine includes a plurality of control mechanisms, with each control mechanism of the plurality of control mechanisms configured to adjust an individual variable guide vane.

16. The gas turbine engine of claim 1, wherein the gas turbine engine includes at least one control mechanism configured to adjust a variable guide vane.

17. A method for adjusting airflow distortion in a gas turbine engine on an aircraft, the gas turbine engine comprising a core engine downstream of a fan section, the core engine comprising a compressor section, a combustion section, and a turbine section in series flow, the compressor section, combustion section, and turbine section defining an engine airflow path, the compressor section comprising a low pressure compressor and a high pressure compressor, the method comprising:

determining, by one or more control devices, an airflow distortion condition associated with the engine airflow path upstream of the low pressure compressor by obtaining one or more measurements associated with the airflow distortion condition using one or more pressure sensor devices located in one or more vanes or struts in the engine airflow path upstream of the low pressure compressor; and controlling, by the one or more control devices, a valve of a valved airflow passage assembly to adjust the airflow distortion condition of the gas turbine engine, wherein the valved airflow passage assembly comprises a duct, the duct defining an inlet at a location in the engine airflow path between the low pressure compressor and the high pressure compressor, the inlet in airflow communication with the engine airflow path, the duct further defining an outlet at a location in the engine airflow path upstream of the low pressure compressor, the outlet in airflow communication with the engine airflow path, the duct comprising an airflow passage extending between the inlet and outlet.

18. The method of claim 17, wherein controlling the valve of the valved airflow passage assembly comprises opening or closing the valve.

19. The method of claim 17, wherein controlling the valve of the valved airflow passage assembly to adjust the airflow distortion condition comprises controlling the valve of the valved airflow passage assembly to reduce the airflow distortion condition.

20. The method of claim 17, wherein the one or more pressure sensor devices comprise a plurality of pressure sensor devices, wherein the core engine comprises a plurality of valved airflow passage assemblies, wherein each valved airflow passage assembly is associated with a respective pressure sensor device of the plurality of pressure sensor devices configured to obtain one or more measurements associated with the valved airflow passage assembly.

* * * * *